US012142287B2

(12) United States Patent
Wu

(10) Patent No.: US 12,142,287 B2
(45) Date of Patent: Nov. 12, 2024

(54) METHOD FOR TRANSFORMING AUDIO SIGNAL, DEVICE, AND STORAGE MEDIUM

(71) Applicant: BIGO TECHNOLOGY PTE. LTD., Singapore (SG)

(72) Inventor: Xiaojie Wu, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 212 days.

(21) Appl. No.: 17/416,709

(22) PCT Filed: Nov. 29, 2019

(86) PCT No.: PCT/CN2019/121838

§ 371 (c)(1),
(2) Date: Jun. 21, 2021

(87) PCT Pub. No.: WO2020/134851

PCT Pub. Date: Jul. 2, 2020

(65) Prior Publication Data

US 2022/0051685 A1 Feb. 17, 2022

(30) Foreign Application Priority Data

Dec. 28, 2018 (CN) ......................... 201811628761.6

(51) Int. Cl.

| | |
|---|---|
| ***G10L 21/013*** | (2013.01) |
| ***G10L 21/034*** | (2013.01) |
| ***G10L 25/90*** | (2013.01) |

(52) U.S. Cl.

CPC .......... *G10L 21/013* (2013.01); *G10L 21/034* (2013.01); *G10L 25/90* (2013.01)

(58) Field of Classification Search

CPC ...... G10L 21/013; G10L 21/034; G10L 25/90

See application file for complete search history.

(56) References Cited

U.S. PATENT DOCUMENTS

| | | | |
|---|---|---|---|
| 6,046,395 | A | 4/2000 | Gibson et al. |
| 6,336,092 | B1 | 1/2002 | Gibson et al. |

(Continued)

FOREIGN PATENT DOCUMENTS

| | | | |
|---|---|---|---|
| CN | 1164084 | A | 11/1997 |
| CN | 1719514 | A | 1/2006 |

(Continued)

OTHER PUBLICATIONS

European Patent Office, Supplementary European Search Report Communication Pursuant to Rule 62 EPC, dated Jan. 26, 2022 in Patent Application No. EP 19902578.4, which is a foreign counterpart to this US application.

(Continued)

*Primary Examiner* — Bhavesh M Mehta
*Assistant Examiner* — Edward Tracy, Jr.
(74) *Attorney, Agent, or Firm* — Kolitch Romano Dascenzo Gates LLC

(57) ABSTRACT

A method for transforming an audio signal comprises obtaining a plurality of segmental original frequency-domain signal segments and a plurality of segmental target frequency-domain signal segments by segmenting and performing a Fourier transform on an original audio signal and an initial target audio signal obtained by pitch shifting on the original audio signal; obtaining a plurality of original formant envelopes by respectively filtering the plurality of segmental original frequency-domain signal segments according to a plurality of original segment window functions, and obtaining a plurality of target formant envelopes by respectively filtering the plurality of segmental target frequency-domain signal segments according to a plurality of target segment window functions; and determining a pitch-shifted audio signal based on the plurality of segmental target frequency-domain signal segments, the plurality of (Continued)

original formant envelopes, and the plurality of target formant envelopes.

16 Claims, 5 Drawing Sheets

(56) References Cited

U.S. PATENT DOCUMENTS

| | | | | |
|---|---|---|---|---|
| 9,240,193 | B2 | 1/2016 | James | |
| 9,583,116 | B1 * | 2/2017 | Szanto | G10L 21/013 |
| 9,947,341 | B1 * | 4/2018 | Marsh | G10L 25/18 |
| 2007/0010999 | A1 | 1/2007 | Klein et al. | |
| 2007/0282602 | A1 * | 12/2007 | Fujishima | G10L 21/04<br>704/207 |
| 2009/0228288 | A1 | 9/2009 | Tanaka et al. | |
| 2010/0286991 | A1 | 11/2010 | Hedelin et al. | |
| 2010/0292994 | A1 | 11/2010 | Lee et al. | |
| 2016/0284343 | A1 | 9/2016 | Short et al. | |
| 2017/0133023 | A1 | 5/2017 | Disch et al. | |

FOREIGN PATENT DOCUMENTS

| | | | |
|---|---|---|---|
| CN | 101354889 | A | 1/2009 |
| CN | 101527141 | A | 9/2009 |
| CN | 102592590 | A | 7/2012 |
| CN | 105304092 | A | 2/2016 |
| CN | 106057208 | A | 10/2016 |
| CN | 106228973 | A | 12/2016 |
| CN | 108988822 | A | 12/2018 |
| RU | 2456682 | C2 | 7/2012 |
| RU | 2668397 | C2 | 9/2018 |

OTHER PUBLICATIONS

Communication Pursuant to Article 94(3) EPC of Counterpart EP Application No. 19902578.4 issued on Feb. 7, 2022, which is a foreign counterpart to this US application.

Indian Examination Report of Counterpart Indian Application No. 202127027987 issued on Mar. 11, 2022, which is a foreign counterpart to this US application.

Russian Grant Decision of Counterpart Russian Application No. 2021119297 issued on Mar. 14, 2022, which is a foreign counterpart to this US application.

International Search Report of the International Searching Authority for State Intellectual Property Office of the People's Republic of China in PCT application No. PCT/CN2019/121838 issued on Feb. 21, 2020, which is an international application corresponding to this U.S. application.

The State Intellectual Property Office of People's Republic of China, First Office Action in Patent Application No. 201811628761.6 issued on Aug. 20, 2020, which is a foreign counterpart application corresponding to this U.S. Patent Application, to which this application claims priority.

Notification to Grant Patent Right for Invention of Chinese Application No. 201811628761.6 issued on Nov. 9, 2020.

Konno, Hideaki, et al., "Acoustic characteristics related to the perceptual pitch in whispered vowels"; 2013 IEEE Workshop on Automatic Speech Recognition and Understanding; Jan. 9, 2014.

Lei, Yingsi; "The Research of Speech Time Scale Modification and Pitch Shifting Technology"; China Excellent Master's Thesis Full-text Database Information Technology Series; Apr. 30, 2016.

Zhang, Xiaorui; "Study of pitch shifting technology and the sound quality evaluating"; Journal of Shandong University ( Engineering Science), vol. 41, No. 1; Feb. 28, 2011.

1 Communication pursuant to Article 94(3) EPC of European application No. 19902578.4 issued on Jul. 3, 2023.

Summons to attend oral proceedings pursuant to Rule 115(1) EPC of European application No. 19902578.4 issued on Jan. 23, 2024.

Summons to attend oral proceedings pursuant to Rule 115(1) EPC of European application No. 19902578.4 issued on Mar. 11, 2024.

Fujimoto, K. et al., "Estimation and tracking of fundamental, 2nd and 3d harmonic frequencies for spectrogram normalization in speech recognition", Bulletin of the Polish Academy of Sciences. Technical Sciences, vol. 60, No. 1, Jan. 1, 2012, entire document.

Goodwin, Michael Mark; "Adaptive signal models: Theory, algorithms, and audio applications", Jan. 1, 1997, entire document.

* cited by examiner

METHOD FOR TRANSFORMING AUDIO SIGNAL, DEVICE, AND STORAGE MEDIUM

CROSS-REFERENCE TO RELATED APPLICATION

This application is a U.S. national phase of international Application No. PCT/CN2019/121838, filed on Nov. 29, 2019, which claims priority to Chinese Patent Application No. 201811628761.6, filed on Dec. 28, 2018. Both applications are herein incorporated by reference in their entireties.

TECHNICAL FIELD

The present disclosure relates to the technical field of voice recognition, and in particular to a method for transforming an audio signal and apparatus, a device, and a storage medium.

BACKGROUND

With the rapid development of Internet technologies, entertainment software that changes the pitch of the original voice by a pitch shift algorithm has been widely used in our daily life. This type of software provides a new way of entertainment and relaxation for users by playing the pitch-shifted voice. For example, during modification of original recording of a singer, defective voice will be pitch-shifted to make the song sound better.

SUMMARY

Embodiments of the present disclosure provide a method for transforming an audio signal and apparatus, a device, and a storage medium, which can perform pitch shifting on an original audio signal while ensuring the consistency of voice characteristics in audio signals before and after the pitch shifting, thereby improving the quality of a pitch-shifted audio signal.

An embodiment of the present disclosure provides a method for transforming an audio signal, including:

- obtaining a segmental original frequency-domain signal and a segmental target frequency-domain signal by respectively segmenting and performing a Fourier transform on an original audio signal and an initial target audio signal obtained by pitch shifting on the original audio signal;
- obtaining a corresponding original formant envelopes by filtering the segmental original frequency-domain signals according to an original segment window function, and obtaining a corresponding target formant envelope by filtering the segmental target frequency-domain signal according to a target segment window function, wherein the original segment window function is determined according to a base frequency and a segment ratio of the segmental original frequency-domain signal, and the target segment window function is determined according to a base frequency and a segment ratio of the segmental target frequency-domain signal; and
- determining a pitch-shifted audio signal according to a segmental target frequency-domain signal and a ratio of an original formant envelopes and a target formant envelope corresponding to the segmental target frequency-domain signal;
- wherein pitch shifting of the initial target audio signal is to adjust the audio pitch, and pitch shifting of the pitch-shifted audio signal enables the voice characteristics in the audio signal before and after the pitch shifting to be consistent.

An embodiment of the present disclosure provides an electric device, including:

- one or more processors; and
- a storage apparatus, configured to store one or more programs;
- wherein the one or more processors, when executing the one or more programs, are caused to perform a method for transforming an including:
- obtaining a segmental original frequency-domain signal and a segmental target frequency-domain signal by respectively segmenting and performing a Fourier transform on an original audio signal and an initial target audio signal obtained by pitch shifting on the original audio signal;
- obtaining a corresponding original formant envelopes by filtering the segmental original frequency-domain signals according to an original segment window function, and obtaining a corresponding target formant envelope by filtering the segmental target frequency-domain signal according to a target segment window function, wherein the original segment window function is determined according to a base frequency and a segment ratio of the segmental original frequency-domain signal, and the target segment window function is determined according to a base frequency and a segment ratio of the segmental target frequency-domain signal; and
- determining a pitch-shifted audio signal according to a segmental target frequency-domain signal and a ratio of an original formant envelopes and a target formant envelope corresponding to the segmental target frequency-domain signal;
- wherein pitch shifting of the initial target audio signal is to adjust the audio pitch, and pitch shifting of the pitch-shifted audio signal enables the voice characteristics in the audio signal before and after the pitch shifting to be consistent.

An embodiment of the present disclosure provides a non-transitory computer-readable storage medium, storing a computer program, wherein the computer program, when executed by a processor, causes the processor to perform a method for transforming an audio signal including:

- obtaining a segmental original frequency-domain signal and a segmental target frequency-domain signal by respectively segmenting and performing a Fourier transform on an original audio signal and an initial target audio signal obtained by pitch shifting on the original audio signal;
- obtaining a corresponding original formant envelopes by filtering the segmental original frequency-domain signals according to an original segment window function, and obtaining a corresponding target formant envelope by filtering the segmental target frequency-domain signal according to a target segment window function, wherein the original segment window function is determined according to a base frequency and a segment ratio of the segmental original frequency-domain signal, and the target segment window function is determined according to a base frequency and a segment ratio of the segmental target frequency-domain signal; and
- determining a pitch-shifted audio signal according to a segmental target frequency-domain signal and a ratio of an original formant envelopes and a target formant envelope corresponding to the segmental target frequency-domain signal;

wherein pitch shifting of the initial target audio signal is to adjust the audio pitch, and pitch shifting of the pitch-shifted audio signal enables the voice characteristics in the audio signal before and after the pitch shifting to be consistent.

BRIEF DESCRIPTION OF THE DRAWINGS

FIG. 4 is a schematic structural diagram of an apparatus for transforming an audio signal according to Embodiment 4 of the present disclosure; and.

DETAILED DESCRIPTION

The present disclosure is described below with reference to the accompanying drawings and embodiments. The specific embodiments described herein are merely intended to explain the present disclosure, rather than to limit the present disclosure. For ease of description, only a partial structure related to the present disclosure rather than all the structure is shown in the accompany drawings.

When the original voice is processed by using the pitch shift algorithm, although the purpose of pitch adjustment is achieved, voice characteristics of the audio user may be changed, causing the played voice to differ significantly from the actual voice of the audio user. For example, when the pitch of a male audio signal is increased by 4 semitones, the signal sounds like a girl's voice and has a certain voice error. In order to overcome the above problem, in the related art, a fixed-length window function is generally used to process short-time Fourier transform signals corresponding to the audio signals before and after the pitch shifting respectively, to obtain formant envelopes corresponding to the audio signals before and after the pitch shifting respectively; then the pitch-shifted audio signal is processed based on the obtained formant envelopes, to finally obtain a pitch-shifted audio signal from which the voice error has been eliminated. However, due to the fixed length of the window function for determining the formant envelopes in the related art, the determined formant envelopes are not accurate, which causes the voice characteristics of the finally obtained pitch-shifted audio signal to be inconsistent with the voice characteristics of the audio signal before the pitch shifting; the pitch-shifted audio signal has poor quality and the voice error cannot be eliminated.

Because the formant reflects the frequency-domain energy distribution of the audio signal and determines the audio quality or the voice characteristics, the present disclosure mainly focuses on processing for the consistency of formant envelopes in the audio signals before and after the pitch shifting to ensure the consistency of voice characteristics in audio signals before and after the pitch shifting when the pitch shifting is performed on the audio signals. In the embodiments of the present disclosure, a formant envelope preserving algorithm is used to eliminate impact of a pitch-shifted target formant envelope on the pitch shifting, such that the formant envelopes before and after the pitch shifting are the same, thereby improving the audio quality of the pitch-shifted audio signal.

Embodiment 1

Figure 1A:
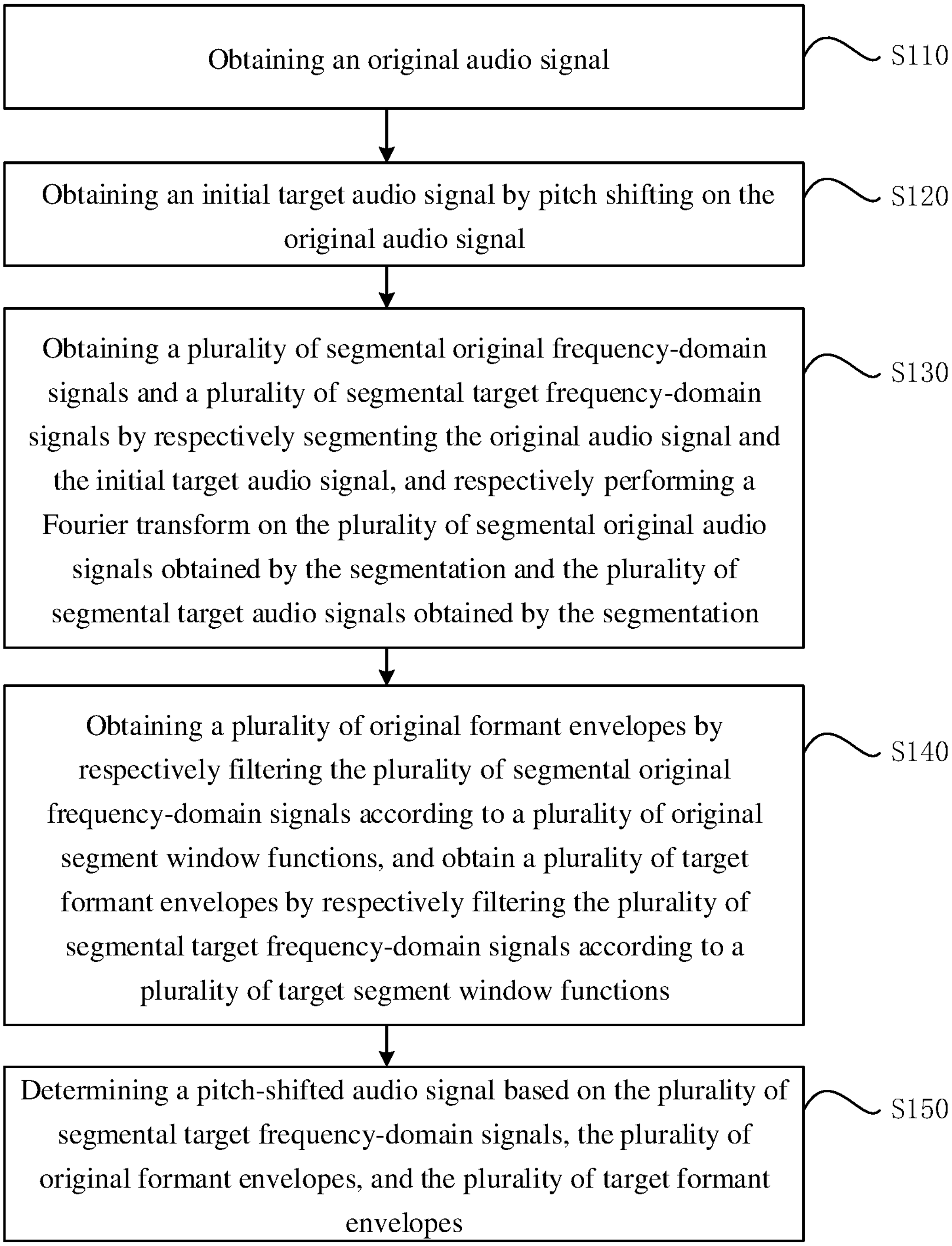
FIG. 1A is a flowchart of a method for transforming an audio signal according to Embodiment 1 of the present, disclosure.

FIG. 1A is a flowchart of a method for transforming an audio signal according to Embodiment 1 of the present disclosure. This embodiment is applicable to any device capable of performing pitch shifting on an audio signal. The technical solutions in the embodiments of the present disclosure are suitable for implementing consistency of voice characteristics in audio signals before and after pitch shifting. A method for transforming an audio signal provided in this embodiment can be executed by an apparatus for transforming an audio signal provided in the embodiments of the present disclosure. The apparatus may be implemented by software and/or hardware, and integrated in a device for executing the method. The device may be a smart terminal configured with any application capable of performing pitch shifting on an audio signal, for example, a smart phone, a tablet computer, a palmtop computer, or the like.

In an embodiment, referring to FIG. 1A, the method may include the following steps.

In S110, an original audio signal is obtained.

In this embodiment, the original audio signal is an audio signal initially recorded by an audio user by a voice collector without any processing, and the original audio signal is encoded in the form of a discrete signal. The original audio signal includes a large number of audio sampling points.

In this embodiment, when pitch shifting needs to be performed on the audio signal, it is necessary to first obtain the original audio signal initially recorded by the audio user and collected by the voice collector, and then pitch shifting is performed on the original audio signal.

In S120, an initial target audio signal is obtained by pitch shifting on the original audio signal.

In this embodiment, pitch shifting refers to adjusting the pitch in the audio signal, that is, adjusting main frequencies in the audio signal, for example, modifying some defective sounds in the original recording of a singer, that is, performing pitch shifting on the audio signal.

In an embodiment, when the original audio signal is obtained and pitch shifting needs to be performed on the original audio signal, pitch shift requirements may be determined, and corresponding pitch shift parameters may be set in corresponding audio pitch shift software based on the pitch shift requirements. Pitch shifting is performed on the original audio signal according to the set pitch shift parameters and a pitch shift algorithm, so as to obtain the initial target audio signal. Because voice characteristics in the original audio signal are destroyed during the pitch shifting, voice characteristics in the initial target audio signal are changed compared with voice characteristics in the original audio signal, and the initial target audio signal cannot be output directly. It is further necessary to restore the changed voice characteristics, to ensure that when the final audio signal is played, an audio user who records the audio signal is clear to other users.

In an embodiment, obtaining the initial target audio signal by pitch shifting on the original audio signal may include: acquiring a pitch shift amplitude; and obtaining the initial target audio signal by pitch shifting on the original audio signal based on the pitch shift amplitude.

In an embodiment, the original audio signal may be processed by using the pitch shift algorithm. In this case, a pitch shift amplitude corresponding to the current pitch shifting is predetermined, such that the pitch shift amplitude is set in the pitch shift algorithm, and the initial target audio signal is obtained by pitch shifting on the original audio signal based on the pitch shift amplitude.

In S130, a plurality of segmental original frequency-domain signals and a plurality of segmental target frequency-domain signals are obtained by respectively segmenting the original audio signal and the initial target audio signal, and respectively performing a Fourier transform on a plurality of segmental original audio signals obtained by the segmentation and a plurality of segmental target audio signals obtained by the segmentation.

In this embodiment, the Fourier transform is a method of transforming a time-domain signal into a frequency-domain signal. Information that cannot be clearly obtained in the time domain may be transformed into the frequency domain for analysis.

In this embodiment, because the original audio signal is an audio signal containing different frequency information over a period of time sent by the audio user, if the Fourier transform is performed directly on the entire original audio signal, a frequency-domain signal obtained correspondingly is a spectrum corresponding to a single frequency determined for all audio information in the entire time domain, which cannot reflect corresponding frequency characteristics in local time domains, and cannot be used for analysis to obtain frequency-domain information in different time periods. Therefore, in this embodiment, a short-time Fourier transform is used to process the original audio signal and the initial target audio signal, so as to obtain frequency-domain information corresponding to the original audio signal and the initial target audio signal in different time periods. The short-time Fourier transform means to represent a frequency-domain characteristic of a moment by using a frequency-domain signal corresponding to a segmental audio signal within a specified time window.

Figure 1B:
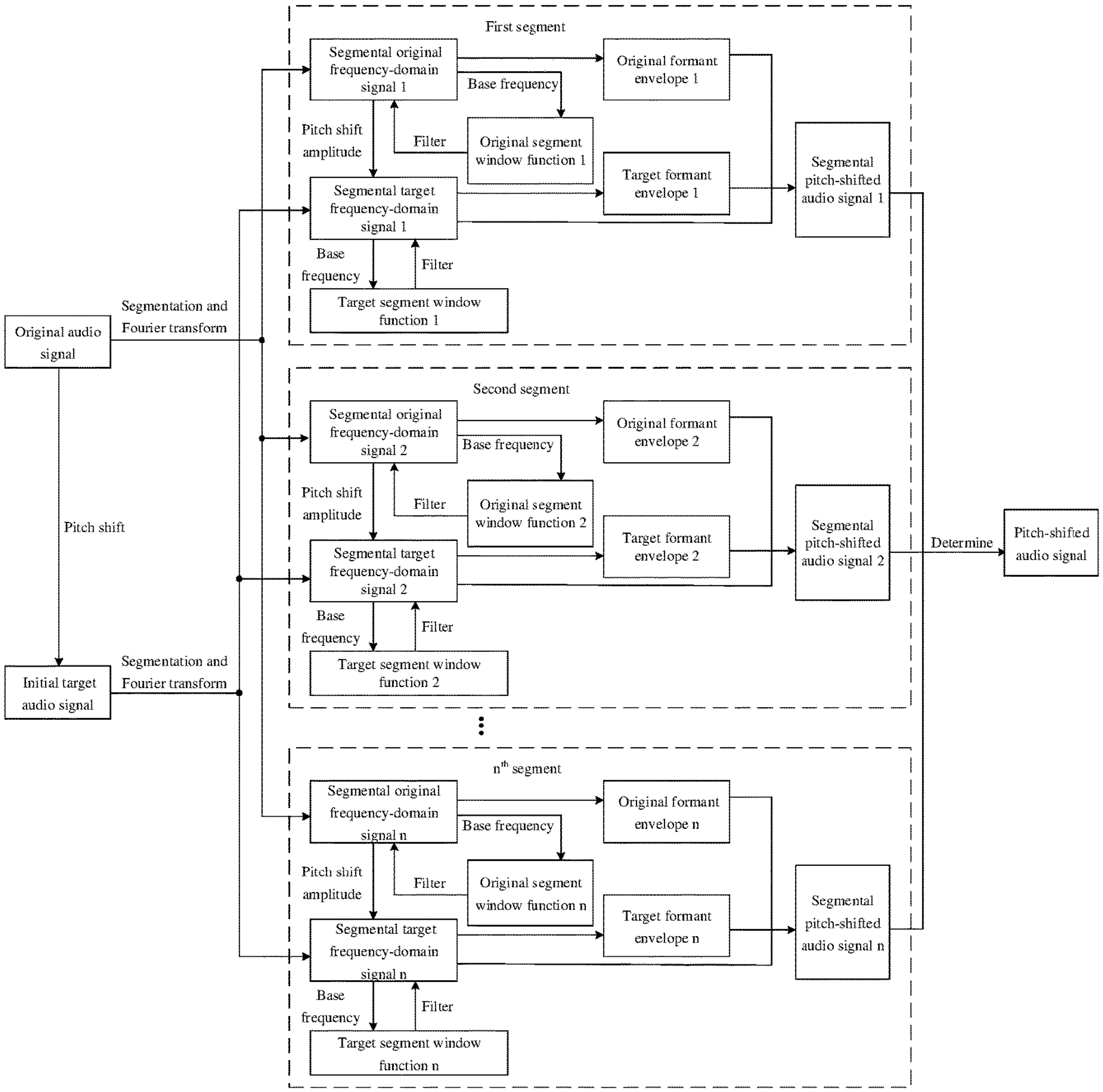
FIG. 1B is a schematic diagram of a principle of a process for transforming an audio signal according to Embodiment 1 of the present disclosure.

In this embodiment, after the original audio signal and the initial target audio signal are obtained, in order to accurately analyze the frequency-domain information of the audio signal at one moment, as shown in FIG. 1B, the original audio signal and the initial target audio signal may be segmented to obtain the plurality of segmental original audio signals and the plurality of segmental target audio signals. Subsequently, the segmental original audio signal and the segmental target audio signal in the same time segment may be analyzed. A Fourier transform is performed on the plurality of segmental original audio signals and the plurality of segmental target audio signals that are obtained by the segmentation, so as to obtain the plurality of segmental original frequency-domain signals and the plurality of segmental target frequency-domain signals within a plurality of segments. Meanwhile, as the original audio signal and the initial target audio signal are segmented in the same segmentation manner, the plurality of segmental original frequency-domain signals and the plurality of segmental target frequency-domain signals obtained by the Fourier transform are also in one-to-one correspondence in the plurality of segments.

In S140, a plurality of original formant envelopes are obtained by respectively filtering the plurality of segmental original frequency-domain signals according to a plurality of original segment window functions, and a plurality of target formant envelopes are obtained by respectively filtering the plurality of segmental target frequency-domain signals according to a plurality of target segment window functions.

In this embodiment, an original segment window function corresponding to each segmental original frequency-domain signal is determined according to a base frequency and a segment length of the each segmental original frequency-domain signal, and a target segment window function corresponding to each segmental target frequency-domain signal is determined according to a base frequency and a segment length of the each segmental target frequency-domain signal. In this embodiment, the original segment window function and the target segment window function are adaptive variable-length window functions. The plurality of obtained original segment window functions have different lengths due to different base frequencies of the plurality of segmental original frequency-domain signals, and the plurality of obtained target segment window functions also have different lengths due to different base frequencies of the plurality of segmental target frequency-domain signals. As the frequency variations in different audio signal segments are different, analysis performed with a fixed-length window function will cause certain errors. In this embodiment, the adaptive variable-length window functions are used to process the audio signals before and after the pitch shifting in different segments, which can reduce processing errors. In this embodiment, the base frequency of the segmental original audio signal refers to a fundamental frequency contained in the segmental original audio signal, which can be reflected in the segmental original frequency-domain signal; the base frequency of the segmental target frequency-domain signal refers to a fundamental frequency contained in the segmental target frequency-domain signal, which can be reflected in the segmental target frequency-domain signal; the segment length indicates the number of sampling points that should be contained in the audio signal within each segment, and is generally 2n, for example, the segment length may be 1024, 2048, or the like.

In an embodiment, the formant is a region of the frequency-domain signal where the sound energy is relatively concentrated, which determines the voice quality. The formant of the signal can be used to determine an audio user who sends the audio signal. The formant envelope is a frequency domain range formed by connecting highest amplitude points corresponding to different frequencies in the frequency-domain signal, and can represent voice characteristics of the audio user in the current segment.

In an embodiment, in order to improve the signal processing rate, during determining of the base frequency of the segmental target frequency-domain signal, because the pitch shifting of the signal is to adjust the frequency of the signal, the base frequency of the segmental target frequency-domain signal within a segment may be directly determined according to the base frequency of the segmental original frequency-domain signal within the segment and the pitch shifting amplitude. It is unnecessary to re-detect the base frequencies of the plurality of segmental target frequency-domain signals, thereby reducing additional detection operations and improving the signal processing rate.

In an embodiment, when the segmental original frequency-domain signals and the segmental target frequency-domain signals are obtained, the base frequency of each segmental original frequency-domain signal may be detected first, and the corresponding original segment window function is determined based on the base frequency and the segment length of the segmental original frequency-domain signal. Only the segmental original frequency-domain signal within the corresponding segment is processed based on the original segment window function, while other segmental original frequency-domain signals are not processed. Different segmental original frequency-domain signals correspond to different original segment window functions due to the different segmental original frequency-domain signals having different base frequencies. For the segmental target frequency-domain signals, the plurality of target segment window functions corresponding to the plurality of segmental target frequency-domain signals are determined in the same manner according to the base frequencies and the segment lengths of the plurality of segmental target frequency-domain signals.

In an embodiment, the plurality of segmental original frequency-domain signals are filtered by using the plurality of original segment window functions corresponding to the plurality of segmental original frequency-domain signals, thereby obtaining the plurality of original formant envelopes corresponding to the plurality of segmental original frequency-domain signals. Meanwhile, the plurality of segmental target frequency-domain signals are filtered by using the plurality of target segment window functions corresponding to the plurality of segmental target frequency-domain signals, thereby obtaining the plurality of target formant envelopes corresponding to the plurality of segmental target frequency-domain signals. The number of original formant envelopes and the number of target formant envelopes correspond to the number of segments.

The window functions in this embodiment may be interpreted as low-pass filters in different forms when filtering the frequency-domain signals, and the adaptive variable length of the window function used can cause the corresponding low-pass filtering performance to vary with the characteristics of the frequency-domain signal.

In S150, a pitch-shifted audio signal is determined based on the plurality of segmental target frequency-domain signals, the plurality of original formant envelopes, and the plurality of target formant envelopes.

In this embodiment, the pitch-shifted audio signal is a finally outputted audio signal, which is obtained after the pitch shifting is performed on the original audio signal, impact on voice characteristics caused by the pitch shifting has been eliminated, and the pitch-shifted audio signal has voice characteristics consistent with those of the original audio signal.

After the plurality of original formant envelopes and the plurality of target formant envelopes are obtained, in order to ensure the consistency of the voice characteristics in the audio signals before and after the pitch shifting, it is necessary to eliminate the impact of the target formants in the plurality of segmental target frequency-domain signals after the pitch shifting. In an embodiment, a ratio of the original formant envelope to the target formant envelope within each segment is determined, to represent the change of the voice characteristics in the segmental original frequency-domain signal before the pitch shifting and the segmental target frequency-domain signal after the pitch shifting within the segment. The final corresponding segmental frequency-domain signal within the segment is determined based on the segmental target frequency-domain signal within the segment and the ratio. Finally, the segmental frequency-domain signals within the plurality of segments are determined based on the plurality of segmental target frequency-domain signals within the plurality of segments and the plurality of corresponding ratios. A final pitch-shifted frequency-domain signal is obtained from the plurality of segmental frequency-domain signals, thereby determining the final pitch-shifted audio signal.

According to the technical solution provided in this embodiment, a plurality of segmental original frequency-domain signals and a plurality of segmental target frequency-domain signals are obtained by segmenting an original audio signal and an initial target audio signal obtained by pitch shifting on the original audio signal, and a Fourier transform is performed respectively on a plurality of segmental original audio signals obtained by the segmentation and a plurality of segmental target audio signals obtained by the segmentation. A plurality of original segment window functions are determined according to base frequencies and the segment lengths of the plurality of segmental original frequency-domain signals, and a plurality of target segment window functions are determined according to base frequencies and segment lengths of the plurality of segmental target frequency-domain signals. Different segmental signals can correspond to different segment window functions. Subsequently, a plurality of original formant envelopes and a plurality of target formant envelopes are obtained by respectively filtering the plurality of segmental original frequency-domain signals and the plurality of segmental target frequency-domain signals according to the plurality of original segment window functions and the plurality of target segment window functions. Thus, acquisition errors of the formant envelopes before and after the pitch shifting are reduced. Then, a final pitch-shifted audio signal is determined based on the plurality of segmental target frequency-domain signals and the plurality of formant envelopes before and after the pitch shifting. Impact of the target formant envelopes on the pitch shifting is eliminated, such that the audio signals before and after the pitch shifting have the same formant envelopes, thereby ensuring the consistency of voice characteristics in the audio signals before and after the pitch shifting, and improving audio quality of the pitch-shifted audio signal.

Embodiment 2

Figure 2:
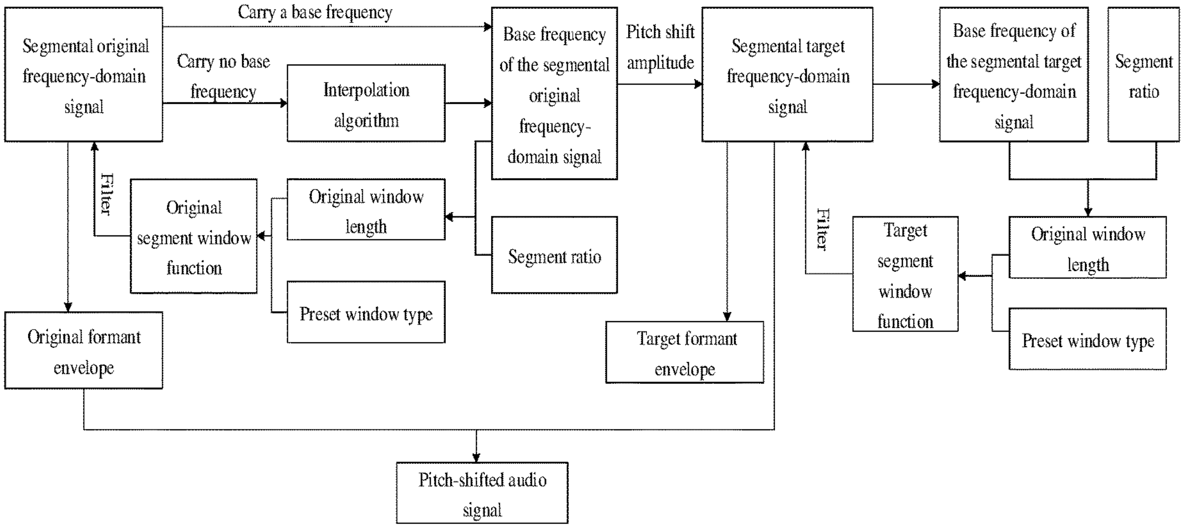
FIG. 2 is a schematic diagram of principles of a base frequency detection process and a window function construction process according to Embodiment 2 of the present disclosure.

FIG. 2 is a schematic diagram of principles of a base frequency detection process and a window function construction process according to Embodiment 2 of the present disclosure. This embodiment is described on the basis of the foregoing embodiment. This embodiment mainly describes a process of detecting the base frequencies of the plurality of segmental original frequency-domain signals obtained by performing the Fourier transform after the original audio signal is segmented, and a process of constructing the plurality of original segment window functions corresponding to the plurality of segmental original frequency-domain signals and the plurality of target segment window functions corresponding to the plurality of segmental target frequency-domain signals.

The method in this embodiment may include the following steps.

In S2010, an original audio signal is obtained.

In S2020, an initial target audio signal is obtained by pitch shifting on the original audio signal.

In S2030, a plurality of segmental original frequency-domain signals and a plurality of segmental target frequency-domain signals are obtained by respectively segmenting the original audio signal and the initial target audio signal, and respectively performing a Fourier transform on a plurality of segmental original audio signals obtained by the segmentation and a plurality of segmental target audio signals obtained by the segmentation.

In S2040, whether each segmental original frequency-domain signal in the plurality of segmental original frequency-domain signals carries a base frequency is determined; if the segmental original frequency-domain signal carries a base frequency, S2050 is performed; and if the segmental original frequency-domain signal does not carry a base frequency, S2060 is performed.

In an embodiment, the segmental original frequency-domain signals and the segmental target frequency-domain signals need to be filtered by using window functions subsequently, so as to determine the corresponding formant envelopes. Therefore, in this embodiment, in order to improve the accuracy of the formant envelopes of the frequency-domain signals in different segments before and after the pitch shifting, it is necessary to filter the different frequency-domain signals by using adaptive variable-length window functions. In this case, window functions correspondingly used for the plurality of frequency-domain signals may be determined according to base frequencies and the segment lengths of the different frequency-domain signals. Therefore, in this embodiment, base frequencies of the segmental original frequency-domain signals need to be detected first. In this case, it is determined whether each segmental original frequency-domain signal in the plurality of segmental original frequency-domain signals carries a base frequency. In this embodiment, for the subsequent analysis of the effectiveness of the base frequency detection result, the determining result of whether the current segmental original frequency-domain signal carries a base frequency can be marked. If the current segmental original frequency-domain signal carries a base frequency, an actual result of the base frequency is marked. If the current segmental original frequency-domain signal does not carry a base frequency, a preset flag is used to mark the current segmental original frequency-domain signal, such that the segmental original frequency-domain signal that does not carry a base frequency is clearly obtained subsequently.

In S2050, the carried base frequency is used as a base frequency of the each segmental original frequency-domain signal.

In an embodiment, if the current segmental original frequency-domain signal carries a base frequency, the carried base frequency is directly used as the base frequency of the current segmental original frequency-domain signal.

In S2060, a base frequency of the each segmental original frequency-domain signal is determined according to a base frequency of a previous segmental original frequency-domain signal of the each segmental original frequency-domain signal and a base frequency of a subsequent segmental original frequency-domain signal of the each segmental original frequency-domain signal.

In an embodiment, the base frequency detection may fail due to the presence of a soft part or a weak signal part in the original audio signal. Therefore, after the segmentation and Fourier transform of the original audio signal, the segmental original frequency-domain signal corresponding to the soft part or the weak signal part may not carry a base frequency. In this embodiment, if the current segmental original frequency-domain signal does not carry a base frequency, in order to smooth the base frequency detection result, the base frequency of the current segmental original frequency-domain signal is determined according to the base frequency of the previous segmental original frequency-domain signal and the base frequency of the subsequent segmental original frequency-domain signal.

In an embodiment, determining the base frequency of the each segmental original frequency-domain signal according to the base frequency of the previous segmental original frequency-domain signal of the each segmental original frequency-domain signal and the base frequency of the subsequent segmental original frequency-domain signal of the each segmental original frequency-domain signal may include: calculating, by using an interpolation algorithm, the base frequency of the previous segmental original frequency-domain signal of the each segmental original frequency-domain signal and the base frequency of the subsequent segmental original frequency-domain signal of the each segmental original frequency-domain signal to obtain the base frequency of the each segmental original frequency-domain signal.

In this embodiment, the interpolation algorithm may be used to calculate the base frequency of the previous segmental original frequency-domain signal and the base frequency of the subsequent segmental original frequency-domain signal of the current segmental original frequency-domain signal, so as to obtain the base frequency of the current segmental original frequency-domain signal.

In S2070, a base frequency of each segmental target frequency-domain signal is determined according to a product of the base frequency of the each segmental original frequency-domain signal and a pitch shift amplitude.

In S2080, an original window length corresponding to each segmental original frequency-domain signal is obtained according to the base frequency and the segment length of the each segmental original frequency-domain signal; and an original segment window function corresponding to each segmental original frequency-domain signal is constructed according to the original window length and a preset window type corresponding to the each segmental original frequency-domain signal.

In this embodiment, after the base frequencies of the plurality of segmental original frequency-domain signals are obtained, the original window lengths of the window functions used within the plurality of segments may be determined according to the base frequencies and the segment lengths of the plurality of segmental original frequency-domain signals. For example, the original window length may be determined in the following manner: $Ln\_s=Pn*N/Fs$, wherein $Ln_s$ is the original window length, $Pn$ is the base frequency of the segmental original frequency-domain signal, $N$ is the segment length, that is, the number of sampling points within each segment, and $Fs$ is the sampling rate of the original audio signal, which is generally 48 kHz.

In an embodiment, the preset window types refer to different types of window functions, which may be a triangular window, a rectangular window, a Hanning window, or the like, which are not limited in this embodiment. The plurality of original segment window functions corresponding to the plurality of segmental original frequency-domain signals may be constructed according to the original window lengths and preset window types corresponding to the plurality of segmental original frequency-domain signals, and the corresponding segmental original frequency-domain signals are subsequently filtered by using the plurality of original segment window functions respectively.

In S2090, a target window length corresponding to each segmental target frequency-domain signal is obtained according to the base frequency and the segment length of the segmental target frequency-domain signal; and a target segment window function corresponding to the each segmental target frequency-domain signal is constructed according to the target window length and a preset window type corresponding to the each segmental target frequency-domain signal.

In this embodiment, after the base frequencies of the plurality of segmental target frequency-domain signals are obtained according to the base frequencies of the plurality of segmental original frequency-domain signals and the pitch shift amplitude, the target window length of the window function used in each segment may be determined according to the base frequency and the segment length of the each segmental target frequency-domain signal. Exemplarily, the target window length may be determined in the following manner: Ln_s=Pn*Ratio*N/Fs; wherein Ln_s is the window length, Pn is the base frequency of the segmental original frequency-domain signal, Ratio is the pitch shift amplitude, N is the segment length, that is, the number of sampling points within each segment, and Fs is the sampling rate of the initial target audio signal, which is generally 48 kHz.

In an embodiment, the plurality of target segment window functions corresponding to the plurality of segmental target frequency-domain signals may be constructed according to the target window lengths and preset window types corresponding to the plurality of segmental target frequency-domain signals, and the plurality of corresponding segmental target frequency-domain signals are subsequently filtered by using the plurality of target segment window functions respectively.

S2080 and S2090 do not have a strict execution sequence and may be executed simultaneously, which is not limited in this embodiment.

In S2100, a plurality of original formant envelopes are obtained by respectively filtering the plurality of segmental original frequency-domain signals according to the plurality of original segment window functions, and a plurality of target formant envelopes are obtained by respectively filtering the plurality of segmental target frequency-domain signals according to the plurality of target segment window functions.

In S2110, a pitch-shifted audio signal is determined based on the plurality of segmental target frequency-domain signals, the plurality of original formant envelopes, and the plurality of target formant envelopes.

According to the technical solution provided in this embodiment, base frequencies of a plurality of segmental original frequency-domain signals and a plurality of segmental target frequency-domain signals are determined; a plurality of corresponding original window lengths in a plurality of segments are determined respectively according to base frequencies and the segment lengths of the plurality of segmental original frequency-domain signals in the plurality of segments, and a plurality of corresponding target window lengths in the plurality of segments are determined respectively according to base frequencies and the segment lengths of the plurality of segmental target frequency-domain signals in the plurality of segments. Adaptive variable-length window functions are constructed. A plurality of original formant envelopes and a plurality of target formant envelopes are obtained by filtering the plurality of segmental original frequency-domain signals and the plurality of segmental target frequency-domain signals. Thus, acquisition errors of the formant envelopes before and after the pitch shifting are reduced. Impact of the target formant envelopes on the pitch shifting is eliminated according to the formant envelopes before and after the pitch shifting, such that the audio signals before and after the pitch shifting have the same formant envelopes, thereby ensuring the consistency of voice characteristics in the audio signals before and after the pitch shifting, and improving audio quality of the pitch-shifted audio signal.

Embodiment 3

Figure 3:
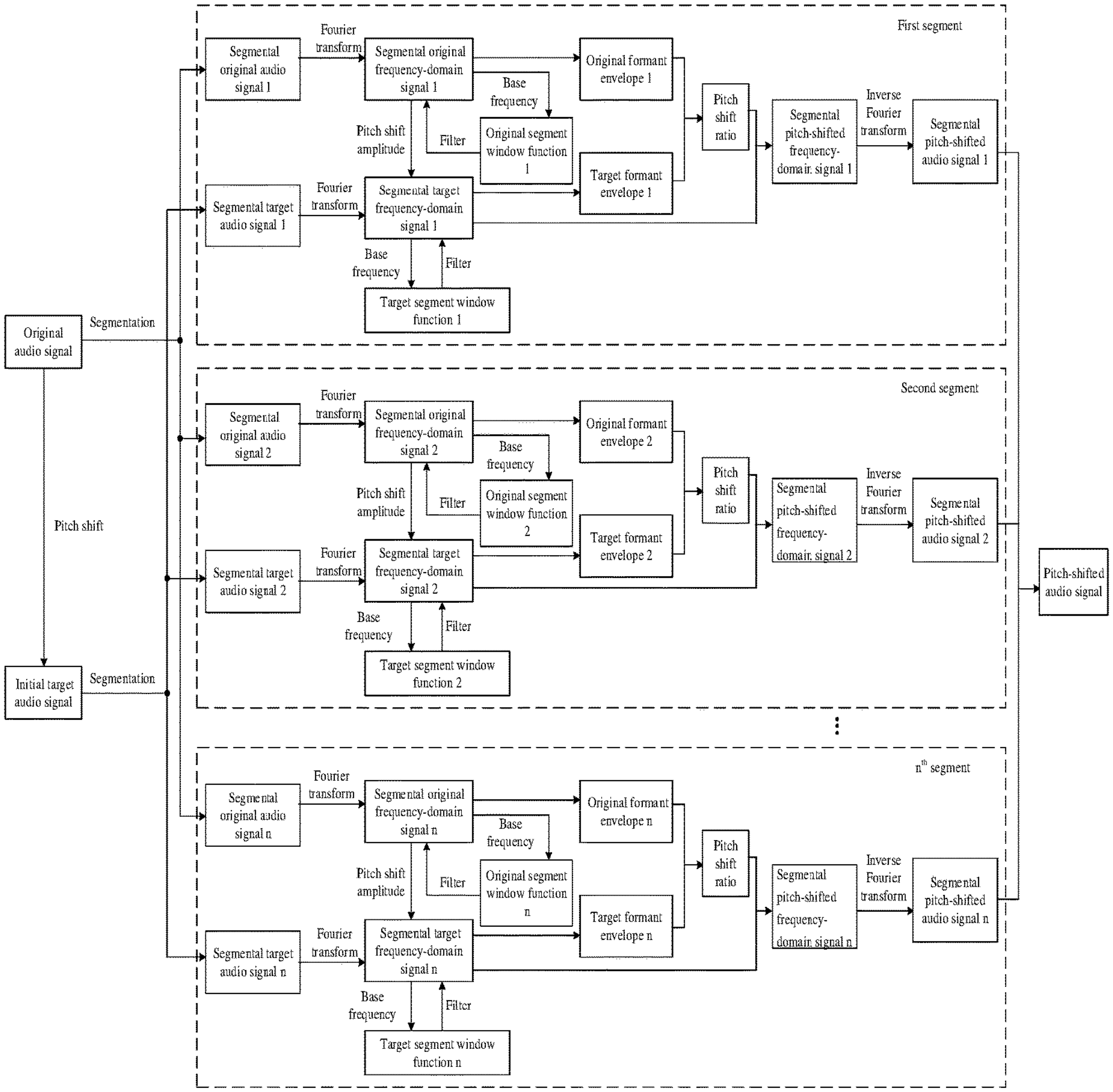
FIG. 3 is a schematic diagram of a principle of a process for transforming an audio signal according to Embodiment 3 of the present disclosure.

FIG. 3 is a schematic diagram of a principle of an audio signal transformation process according to Embodiment 3 of the present disclosure. This embodiment is described on the basis of the foregoing embodiments. This embodiment describes a process of performing segmentation processing and a Fourier transform on an audio signal and a process of determining a pitch-shifted audio signal.

This embodiment may include the following steps.

In S310, an original audio signal is obtained.

In S320, an initial target audio signal is obtained by pitch shifting on the original audio signal.

In S330, a plurality of segmental original audio signals and a plurality of segmental target audio signals are obtained by segmenting the original audio signal and the initial target audio signal according to a preset segment length and a segment displacement.

In an embodiment, during segmentation of the original audio signal and the initial target audio signal in this embodiment, the preset segment length and segment displacement corresponding to the current segmentation need to be determined first. The preset segment length indicates the number of sampling points that should be contained in the audio signal in each segment, which is generally 2n. For example, the preset segment length may be 1024, 2048, or the like. The segment displacement indicates a distance between starting sampling points of adjacent segments. If the preset segment length is 1024 and the segment displacement is 512, the first segment consists of sampling points 1-1024, and the second segment consists of sampling points 513-1536. In this embodiment, the plurality of segmental original audio signals and the plurality of segmental target audio signals within a plurality of segments are obtained by segmenting the original audio signal and the initial target audio signal according to the preset segment length and the segment displacement.

In S340, a plurality of segmental original frequency-domain signals and a plurality of segmental target frequency-domain signals are obtained by respectively performing a Fourier transform on the plurality of segmental original audio signals and the plurality of segmental target audio signals.

In an embodiment, when the plurality of segmental original audio signals and the plurality of segmental target audio signals are obtained, a Fourier transform may be performed on the plurality of segmental original audio signals and the plurality of segmental target audio signals within the plurality of segments, to obtain the plurality of segmental original frequency-domain signals and the plurality of segmental target frequency-domain signals corresponding to the plurality of segments.

In S350, a plurality of original formant envelopes are obtained by respectively filtering the plurality of segmental original frequency-domain signals according to a plurality of original segment window functions, and a plurality of target formant envelopes are obtained by respectively filtering the plurality of segmental target frequency-domain signals according to a plurality of target segment window functions, wherein an original segment window function corresponding to each segmental original frequency-domain signal is determined according to a base frequency and a segment length of the each segmental original frequency-domain signal, and a target segment window function corresponding to each segmental target frequency-domain signal is determined according to a base frequency and a segment length of the each segmental target frequency-domain signal.

In S360, a pitch shift ratio corresponding to each segmental target frequency-domain signal is determined based on an original formant envelope and a target formant envelope corresponding to the segmental target frequency-domain signal.

In an embodiment, when the original formant envelope corresponding to each segmental original frequency-domain signal and the target formant envelope corresponding to each segmental target frequency-domain signal are obtained, for a single segmental target frequency-domain signal, the original formant envelope and the target formant envelope obtained in the segment corresponding to the segmental target frequency-domain signal may be compared with each other to determine a pitch shift ratio corresponding to the segmental target frequency-domain signal, wherein the pitch shift ratio represents impact of the pitch-shifted target formant envelope on voice characteristics during the pitch shifting process. Based on the same method, a plurality of pitch shift ratios corresponding to the plurality of segmental target frequency-domain signals can be determined.

In S370, a segmental pitch-shifted frequency-domain signal corresponding to each segmental target frequency-domain signal is determined based on the each segmental target frequency-domain signal and the pitch shift ratio corresponding to the each segmental target frequency-domain signal.

In this embodiment, in order to eliminate the impact of the target formant envelope on the voice characteristics during the pitch shifting process, the segmental target frequency-domain signal and the pitch shift ratio corresponding to the target formant envelope can be multiplied to obtain the segmental pitch-shifted frequency-domain signal corresponding to the segment, from which the pitch shift impact has been eliminated. The segmental pitch-shifted frequency-domain signal has the same formant envelope as the segmental original frequency-domain signal within the same segment. Based on the same method, a plurality of segmental pitch-shifted frequency-domain signals corresponding to the plurality of segments, from which the pitch shift impact has been eliminated can be determined. In this embodiment, the corresponding segmental pitch-shifted frequency-domain signal is obtained by the following formula: STFT_tn'=STFT_tn*Esn/Etn, wherein STFT_tn' is the segmental pitch-shifted frequency-domain signal, STFT_tn is the segmental target frequency-domain signal, Esn is the corresponding original formant envelope in the segment, and Etn is the corresponding target formant envelope in the segment.

In S380, a segmental pitch-shifted audio signal corresponding to each segmental target frequency-domain signal is obtained by performing an inverse Fourier transform on the segmental pitch-shifted frequency-domain signal corresponding to the each segmental target frequency-domain signal.

In an embodiment, when the corresponding segmental pitch-shifted frequency-domain signal within each segment is obtained, an inverse Fourier transform may be performed on the corresponding segmental pitch-shifted frequency-domain signal within each segment, so as to obtain the segmental pitch-shifted audio signal within each segment, and the final pitch-shifted audio signal is subsequently determined based on the plurality of segmental pitch-shifted audio signals.

In S390, a pitch-shifted audio signal is determined based on the plurality of segmental pitch-shifted audio signals, the preset segment length, and the segment displacement.

In an embodiment, after the plurality of segmental pitch-shifted audio signals are obtained, the plurality of segmental pitch-shifted audio signals may be assembled according to the preset segment length and segment displacement during segmentation of the original audio signal, to obtain the final pitch-shifted audio signal from which the impact of the target formant envelopes on the voice characteristics during the pitch shifting process has been eliminated. The pitch-shifted audio signal has the same formant envelopes as the original audio signal, thus ensuring the consistency of the voice characteristics in the audio signals before and after the pitch shifting.

In the technical solution provided by this embodiment, for a single segmental target frequency-domain signal, the corresponding pitch shift ratio is determined according to the formant envelope before the pitch shifting and the formant envelope after the pitch shifting, and the corresponding segmental pitch-shifted frequency-domain signal is determined according to the segmental target frequency-domain signal within the segment and the pitch shift ratio, thereby eliminating the impact of the formant envelope within the segment on the pitch shifting. In this way, the plurality of segmental pitch-shifted frequency-domain signals, from which the impact of the formant envelopes has been eliminated, within a plurality of segments are obtained, and a plurality of segmental pitch-shifted audio signals are obtained by using an inverse Fourier transform. The corresponding pitch-shifted audio signal is formed by the plurality of segmental pitch-shifted audio signals, which ensures the consistency of the voice characteristics in the audio signals before and after the pitch shifting and improves the audio quality of the pitch-shifted audio signal.

Embodiment 4

Figure 4:
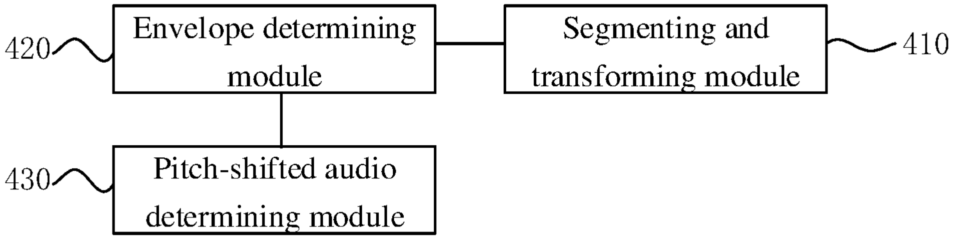

FIG. 4 is a schematic structural diagram of an apparatus for transforming an audio signal according to Embodiment 4 of the present disclosure. As shown in FIG. 4, the apparatus may include: a segmentation and transformation module 410, configured to obtain a plurality of segmental original frequency-domain signals and a plurality of segmental target frequency-domain signals by segmenting an original audio signal and an initial target audio signal obtained by pitch shifting on the original audio signal, and performing a Fourier transform on a plurality of segmental original audio signals obtained by the segmentation and a plurality of segmental target audio signals obtained by the segmentation; an envelope determining module 420, configured to obtain a plurality of original formant envelopes by respectively filtering the plurality of segmental original frequency-domain signals according to a plurality of original segment window functions, and obtain a plurality of target formant envelopes by respectively filtering the plurality of segmental target frequency-domain signals according to a plurality of target segment window functions, wherein an original segment window function corresponding to each segmental original frequency-domain signal is determined according to a base frequency and a segment length of the each segmental original frequency-domain signal, and a target segment window function corresponding to each segmental target frequency-domain signal is determined according to a base frequency and a segment length of the each segmental target frequency-domain signal; and a pitch-shifted audio determining module 430, configured to determine a pitch-shifted audio signal based on the plurality of segmental target frequency-domain signals, the plurality of original formant envelopes, and the plurality of target formant envelopes.

According to the technical solution provided in this embodiment, a plurality of segmental original frequency-domain signals and a plurality of segmental target frequency-domain signals are obtained by segmenting an original audio signal and an initial target audio signal obtained by pitch shifting on the original audio signal, and a Fourier transform is performed on a plurality of segmental original audio signals obtained by the segmentation and a plurality of segmental target audio signals obtained by the segmentation. A plurality of original segment window functions are determined according to base frequencies and segment lengths of the plurality of segmental original frequency-domain signals, and a plurality of target segment window functions are determined according to base frequencies and the segment lengths of the plurality of segmental target frequency-domain signals. Different signal segments can correspond to different segment window functions. Subsequently, a plurality of original formant envelopes and a plurality of target formant envelopes are obtained by respectively filtering the plurality of segmental original frequency-domain signals and the plurality of segmental target frequency-domain signals according to the plurality of original segment window functions and the plurality of target segment window functions. Thus, acquisition errors of the formant envelopes before and after the pitch shifting are reduced. Then, a final pitch-shifted audio signal is determined based on the plurality of segmental target frequency-domain signals and the plurality of formant envelopes before and after the pitch shifting. Impact of the target formant envelopes on the pitch shifting is eliminated, such that the audio signals before and after the pitch shifting have the same formant envelopes, thereby ensuring the consistency of voice characteristics in the audio signals before and after the pitch shifting, and improving audio quality of the pitch-shifted audio signal.

Embodiment 5

Figure 5:
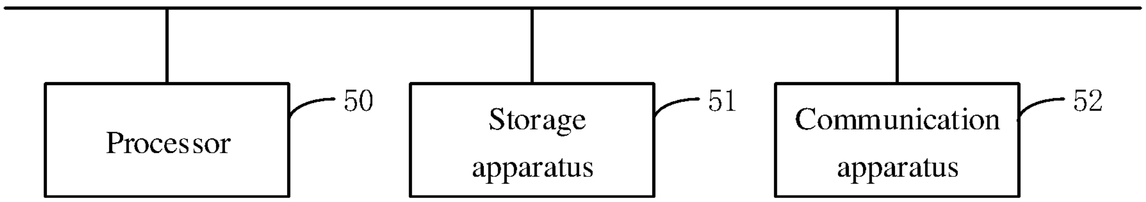
FIG. 5 is a schematic structural diagram of a device according to Embodiment 5 of the present disclosure.

FIG. 5 is a schematic structural diagram of a device according to Embodiment 5 of the present disclosure. As shown in FIG. 5, the device includes a processor 50, a storage apparatus 51, and a communication apparatus 52.

The storage apparatus 51, as a computer-readable storage medium, may be configured to store software programs, computer executable programs, and modules, such as program instructions/modules corresponding to the audio signal transformation method described in any embodiment of the present disclosure. The processor 50 runs the software programs, instructions, and modules stored in the storage apparatus 51, so as to execute various functional applications of the device and data processing, that is, perform the audio signal transformation method described above.

Embodiment 6

This embodiment of the present disclosure further provides a non-transitory computer-readable storage medium, storing a computer program, where the program, when executed by a processor, can perform the audio signal transformation method described in any embodiment of the present disclosure. The method may specifically include: obtaining a plurality of segmental original frequency-domain signals and a plurality of segmental target frequency-domain signals by segmenting an original audio signal and an initial target audio signal obtained by pitch shifting on the original audio signal, and performing a Fourier transform on a plurality of segmental original audio signals obtained by the segmentation and a plurality of segmental target audio signals obtained by the segmentation; obtaining a plurality of original formant envelopes by respectively filtering the plurality of segmental original frequency-domain signals according to a plurality of original segment window functions, and obtaining a plurality of target formant envelopes by respectively filtering the plurality of segmental target frequency-domain signals according to a plurality of target segment window functions, wherein an original segment window function corresponding to each segmental original frequency-domain signal is determined according to a base frequency and a segment length of the each segmental original frequency-domain signal, and a target segment window function corresponding to each segmental target frequency-domain signal is determined according to a base frequency and a segment length of the each segmental target frequency-domain signal; and determining a pitch-shifted audio signal based on the plurality of segmental target frequency-domain signals, the plurality of original formant envelopes, and the plurality of target formant envelopes.

What is claimed is:

1. A method for transforming an audio signal, comprising:

obtaining a segmental original frequency-domain signal and a segmental target frequency-domain signal by respectively segmenting and performing a Fourier transform on an original audio signal and an initial target audio signal obtained by pitch shifting on the original audio signal, wherein the original audio signal and the initial target audio signal are segmented in the same segmentation manner;

obtaining a corresponding original formant envelope by filtering the segmental original frequency-domain signal according to an original segment window function, and obtaining a corresponding target formant envelope by filtering the segmental target frequency-domain signal according to a target segment window function, wherein the original segment window function is determined according to a base frequency and a segment length of the segmental original frequency-domain signal, and the target segment window function is determined according to a base frequency and a segment length of the segmental target frequency-domain signal, and the segment length is a number of sampling points within each segment; and determining a pitch-shifted audio signal according to the segmental target frequency-domain signal and a ratio of the original formant envelope to the target formant envelope corresponding to the segmental target frequency-domain signal, wherein the ratio represents change of voice characteristics in the segmental original frequency-domain signal before the pitch shifting and the segmental target frequency-domain signal after the pitch shifting;

wherein pitch shifting of the initial target audio signal is to adjust an audio pitch, and pitch shifting of the pitch-shifted audio signal enables voice characteristics in the audio signal before and after the pitch shifting to be consistent;

wherein before filtering the segmental original frequency-domain signal according to the original segment window function, the method further comprising:

determining, in a case that a current segmental original frequency-domain signal carries a base frequency, that the carried base frequency is a base frequency of the current segmental original frequency-domain signal; and determining, in a case that the current segmental original frequency-domain signal does not carry a base frequency, a base frequency of the current segmental original frequency-domain signal according to a base frequency of a previous segmental original frequency-domain signal and a base frequency of a subsequent segmental original frequency-domain signal; and wherein determining the base frequency of the current segmental original frequency-domain signal according to the base frequency of the previous segmental original frequency-domain signal and the base frequency of the subsequent segmental original frequency-domain signal comprises:

calculating, by using an interpolation algorithm, the base frequency of the previous segmental original frequency-domain signal and the base frequency of the subsequent segmental original frequency-domain signal to obtain the base frequency of the current segmental original frequency-domain signal.

2. The method according to claim 1, further comprising:

acquiring a pitch shift amplitude; and obtaining the initial target audio signal by pitch shifting on the original audio signal based on the pitch shift amplitude.

3. The method according to claim 2, wherein the base frequency of the segmental target frequency-domain signal is a product of the base frequency of the segmental original frequency-domain signal and the pitch shift amplitude.

4. The method according to claim 1, wherein before obtaining the corresponding original formant envelope by filtering the segmental original frequency-domain signal according to the original segment window function, the method further comprising:

obtaining a corresponding original window length according to a base frequency and a segment length of a segmental original frequency-domain signal; and constructing a corresponding original segment window function according to the original window length and a preset window type.

5. The method according to claim 1, wherein before obtaining the corresponding target formant envelope by filtering the segmental target frequency-domain signal according to the target segment window function, the method further comprising:

obtaining a corresponding target window length according to a base frequency and a segment length of a segmental target frequency-domain signal; and constructing a corresponding target segment window function according to the target window length and a preset window type.

6. The method according to claim 1, wherein obtaining the segmental original frequency-domain signal and the segmental target frequency-domain signal by respectively segmenting and performing the Fourier transform on the original audio signal and the initial target audio signal obtained by pitch shifting on the original audio signal, comprises:

obtaining a segmental original audio signal and a segmental target audio signal by segmenting the original audio signal and the initial target audio signal according to a preset segment length and a segment displacement; and obtaining a segmental original frequency-domain signal and a segmental target frequency-domain signal by performing the Fourier transform on the segmental original audio signal and the segmental target audio signal.

7. The method according to claim 6, wherein determining the pitch-shifted audio signal according to the segmental target frequency-domain signal and the ratio of the original formant envelope to the target formant envelope corresponding to the segmental target frequency-domain signal, comprises:

determining, for a single segmental target frequency-domain signal, a pitch shift ratio corresponding to the segmental target frequency-domain signal based on a corresponding original formant envelope and a target formant envelope;

determining a corresponding segmental pitch-shifted frequency-domain signal based on the segmental target frequency-domain signal and the pitch shift ratio;

obtaining a segmental pitch-shifted audio signal by performing an inverse Fourier transform on the segmental pitch-shifted frequency-domain signal; and determining the pitch-shifted audio signal based on each segmental pitch-shifted audio signal the preset segment length, and the segment displacement.

8. An electronic device, comprising:

one or more processors; and a storage apparatus, configured to store one or more programs;

wherein the one or more processors, when executing the one or more programs, are caused to perform a method for transforming an audio signal comprising:

obtaining a segmental original frequency-domain signal and a segmental target frequency-domain signal by respectively segmenting and performing a Fourier transform on an original audio signal and an initial target audio signal obtained by pitch shifting on the original audio signal, wherein pitch shifting on the initial target audio signal enables adjustment of an audio pitch, wherein the original audio signal and the initial target audio signal are segmented in the same segmentation manner;

obtaining a corresponding original formant envelopes by filtering the segmental original frequency-domain signals according to an original segment window function, and obtaining a corresponding target formant envelope by filtering the segmental target frequency-domain signal according to a target segment window function, wherein the original segment window function is determined according to a base frequency and a segment length of the segmental original frequency-domain signal, and the target segment window function is determined according to a base frequency and a segment length of the segmental target frequency-domain signal, and the segment length is a number of sampling points within each segment; and determining a pitch-shifted audio signal according to the segmental target frequency-domain signal and a ratio of the original formant envelope to the target formant envelope corresponding to the segmental target frequency-domain signal, which enables voice characteristics in the audio signal before and after the pitch shifting to be consistent, wherein the ratio represents change of voice characteristics in the segmental original frequency-domain signal before the pitch shifting and the segmental target frequency-domain signal after the pitch shifting;

wherein before filtering the segmental original frequency-domain signal according to the original segment window function, the method performed by the processor further comprises:

using, in a case that a current segmental original frequency-domain signal carries a base frequency, the carried base frequency as a base frequency of the current segmental original frequency-domain signal; and determining, in a case that the current segmental original frequency-domain signal does not carry a base frequency, a base frequency of the current segmental original frequency-domain signal according to a base frequency of a previous segmental original frequency-domain signal and a base frequency of a subsequent segmental original frequency-domain signal; and wherein determining the base frequency of the current segmental original frequency-domain signal according to the base frequency of the previous segmental original frequency-domain signal and the base frequency of the subsequent segmental original frequency-domain signal comprises:

calculating, by using an interpolation algorithm, the base frequency of the previous segmental original frequency-domain signal and the base frequency of the subsequent segmental original frequency-domain signal to obtain the base frequency of the current segmental original frequency-domain signal.

9. The electronic device according to claim 8, wherein the method performed by the processor further comprises:

acquiring a pitch shift amplitude; and obtaining the initial target audio signal by pitch shifting on the original audio signal based on the pitch shift amplitude.

10. The electronic device according to claim 9, wherein the base frequency of the segmental target frequency-domain signal is a product of the base frequency of the segmental original frequency-domain signal and the pitch shift amplitude.

11. The electronic device according to claim 8, wherein before obtaining the corresponding original formant envelope by filtering the segmental original frequency-domain signal according to the original segment window function, the method performed by the processor further comprises:

obtaining a corresponding original window length according to a base frequency and a segment length of a segmental original frequency-domain signal; and constructing a corresponding original segment window function according to the original window length and a preset window type.

12. The electronic device according to claim 8, wherein before obtaining the corresponding target formant envelope by filtering the segmental target frequency-domain signal according to the target segment window function, the method performed by the processor further comprises:

obtaining a corresponding target window length according to a base frequency and a segment length of a segmental target frequency-domain signal; and constructing a corresponding target segment window function according to the target window length and a preset window type.

13. The electronic device according to claim 8, wherein obtaining the segmental original frequency-domain signal and the segmental target frequency-domain signal by respectively segmenting and performing the Fourier transform on the original audio signal and the initial target audio signal obtained by pitch shifting on the original audio signal, comprises:

obtaining a segmental original audio signal and a segmental target audio signal by segmenting, according to a preset segment length and a segment displacement, the original audio signal and the initial target audio signal; and obtaining a segmental original frequency-domain signal and a segmental target frequency-domain signal by performing the Fourier transform on the segmental original audio signal and the segmental target audio signal.

14. The electronic device according to claim 13, wherein determining the pitch-shifted audio signal according to the segmental target frequency-domain signal and the ratio of the original formant envelope and the target formant envelope corresponding to the segmental target frequency-domain signal, comprises:

determining, for a single segmental target frequency-domain signal, a pitch shift ratio corresponding to the segmental target frequency-domain signal based on a corresponding original formant envelope and a target formant envelope;

determining a corresponding segmental pitch-shifted frequency-domain signal based on the segmental target frequency-domain signal and the pitch shift ratio;

obtaining a segmental pitch-shifted audio signal by performing an inverse Fourier transform on the segmental pitch-shifted frequency-domain signal; and determining the pitch-shifted audio signal based on each segmental pitch-shifted audio signal, the preset segment length, and the segment displacement.

15. A non-transitory computer-readable storage medium, storing a computer program therein, wherein the computer program, when executed by a processor, causes the processor to perform a method for transforming an audio signal comprising:

obtaining a segmental original frequency-domain signal and a segmental target frequency-domain signal by respectively segmenting and performing a Fourier transform on an original audio signal and an initial target audio signal obtained by pitch shifting on the original audio signal, wherein the original audio signal and the initial target audio signal are segmented in the same segmentation manner;

obtaining a corresponding original formant envelopes by filtering the segmental original frequency-domain signals according to an original segment window function, and obtaining a corresponding target formant envelope by filtering the segmental target frequency-domain signal according to a target segment window function, wherein the original segment window function is determined according to a base frequency and a segment length of the segmental original frequency-domain signal, and the target segment window function is determined according to a base frequency and a segment length of the segmental target frequency-domain signal, and the segment length is a number of sampling points within each segment; and determining a pitch-shifted audio signal according to the segmental target frequency-domain signal and a ratio of the original formant envelope to the target formant envelope corresponding to the segmental target frequency-domain signal, wherein the ratio represents change of voice characteristics in the segmental original frequency-domain signal before the pitch shifting and the segmental target frequency-domain signal after the pitch shifting;

wherein pitch shifting of the initial target audio signal is to adjust an audio pitch, and pitch shifting of the pitch-shifted audio signal enables voice characteristics in the audio signal before and after the pitch shifting to be consistent;

wherein before filtering the segmental original frequency-domain signal according to the original segment window function, the method performed by the processor further comprises:

using, in a case that a current segmental original frequency-domain signal carries a base frequency, the carried base frequency as a base frequency of the current segmental original frequency-domain signal; and determining, in a case that the current segmental original frequency-domain signal does not carry a base frequency, a base frequency of the current segmental original frequency-domain signal according to a base frequency of a previous segmental original frequency-domain signal and a base frequency of a subsequent segmental original frequency-domain signal; and wherein determining the base frequency of the current segmental original frequency-domain signal according to the base frequency of the previous segmental original frequency-domain signal and the base frequency of the subsequent segmental original frequency-domain signal comprises:

calculating, by using an interpolation algorithm, the base frequency of the previous segmental original frequency-domain signal and the base frequency of the subsequent segmental original frequency-domain signal to obtain the base frequency of the current segmental original frequency-domain signal.

16. The storage medium according to claim 15, wherein the method performed by the processor further comprises:

acquiring a pitch shift amplitude; and obtaining the initial target audio signal by pitch shifting on the original audio signal based on the pitch shift amplitude.

* * * * *